US012632142B2

(12) United States Patent
Kang et al.

(10) Patent No.: US 12,632,142 B2
(45) Date of Patent: May 19, 2026

(54) TOUCH APPARATUS UTILIZING WAVEFORM PARAMETER CHANGING STRATEGY, TOUCH DRIVING DEVICE AND OPERATION METHOD THEREOF

(71) Applicant: Novatek Microelectronics Corp., Hsinchu (TW)

(72) Inventors: Chun-Wei Kang, Hsinchu (TW); Yen-Cheng Cheng, Hsinchu (TW); Ko Ho Lin, Hsinchu (TW); Syang-Yun Tzeng, Taoyuan (TW); Jhen-Yi Ding, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/432,040

(22) Filed: Feb. 4, 2024

(65) Prior Publication Data

US 2025/0251826 A1     Aug. 7, 2025

(51) Int. Cl.
*G06F 3/041* (2006.01)

(52) U.S. Cl.
CPC ................................. *G06F 3/04166* (2019.05)

(58) Field of Classification Search
CPC .. G06F 3/04166; G06F 3/0412; G06F 3/0418; G06F 3/044; G06F 3/04162; G06F 3/0443
See application file for complete search history.

(56) References Cited

U.S. PATENT DOCUMENTS

| | | | |
|---|---|---|---|
| 9,354,759 | B2 | 5/2016 | Lee |
| 10,572,055 | B2 | 2/2020 | Shin |
| 11,126,302 | B2 | 9/2021 | Shin |
| 11,755,142 | B2 | 9/2023 | Shin |
| 12,099,682 | B2 | 9/2024 | Shin |
| 2011/0090173 | A1* | 4/2011 | Huang .................... G06F 3/044 |
| | | | 345/174 |
| 2011/0157081 | A1* | 6/2011 | Wang ...................... G06F 3/044 |
| | | | 345/174 |

(Continued)

FOREIGN PATENT DOCUMENTS

| | | |
|---|---|---|
| TW | 201520851 | 6/2015 |
| TW | 201802655 | 1/2018 |

OTHER PUBLICATIONS

"Office Action of Taiwan Counterpart Application No. 113106929", issued on Sep. 22, 2025, p. 1-p. 17.

*Primary Examiner* — Richard J Hong
(74) *Attorney, Agent, or Firm* — JCIPRNET

(57) ABSTRACT

A touch apparatus includes a touch panel and a touch driving device. The touch driving device drives the touch panel. The touch driving device includes a driving signal generating circuit and a reading circuit. The driving signal generating circuit generates a driving signal for driving the touch panel. The driving signal includes a first pulse time and a second pulse time for driving a same touch sensor in the touch panel. The driving signal generating circuit uses a first changing strategy to change at least one waveform parameter of the driving signal, so that the at least one waveform parameter of the first pulse time is different from the at least one waveform parameter of the second pulse time. The reading circuit reads the sensing result of the touch panel for a touch event.

45 Claims, 10 Drawing Sheets

(56)         References Cited

U.S. PATENT DOCUMENTS

| | | | |
|---|---|---|---|
| 2012/0182255 A1* | 7/2012 | Kuang | ................. G06F 3/0418 |
| | | | 345/174 |
| 2015/0097807 A1 | 4/2015 | Lee | |
| 2015/0109244 A1* | 4/2015 | Jang | .................... G06F 3/04166 |
| | | | 345/74 |
| 2016/0349906 A1 | 12/2016 | Lee et al. | |
| 2018/0004343 A1 | 1/2018 | Shin | |
| 2018/0107315 A1* | 4/2018 | Lee | ....................... G06F 3/0412 |
| 2018/0188882 A1* | 7/2018 | Kang | ................. G06F 3/04166 |
| 2019/0204944 A1* | 7/2019 | Jun | ....................... G06F 3/0412 |
| 2020/0174617 A1 | 6/2020 | Shin | |
| 2021/0397294 A1 | 12/2021 | Shin | |
| 2022/0004283 A1* | 1/2022 | Akiyoshi | ............. G06F 3/0412 |
| 2023/0084559 A1* | 3/2023 | Choi | .................. G06F 3/04162 |
| | | | 345/174 |
| 2023/0376143 A1 | 11/2023 | Shin | |
| 2024/0310956 A1* | 9/2024 | Kim | ...................... G06F 3/0443 |

* cited by examiner

TOUCH APPARATUS UTILIZING WAVEFORM PARAMETER CHANGING STRATEGY, TOUCH DRIVING DEVICE AND OPERATION METHOD THEREOF

BACKGROUND

Technical Field

The disclosure relates to an electronic device, and in particular to a touch apparatus, a touch driving device, and an operation method thereof.

Description of Related Art

In current touch systems, the waveform of the driving signal used for touch sensing operations is fixed. The so-called fixed waveform means that different pulse times in the driving signal used to drive the same touch sensor in the touch panel have the same waveform parameter. The fixed waveform indicates that the resistance to noise in different frequency bands is also limited. The countermeasure of the old system is to use one fixed waveform until the noise is excessive and then switch to another fixed waveform. This old countermeasure requires extra time to detect noise and decide whether to change to another fixed waveform. The non-negligible response time results in poor user experience. In addition, the old countermeasure requires additional power consumption and additional computility.

SUMMARY

The disclosure provides a touch apparatus, a touch driving device, and an operation method thereof to enhance the resistance of touch sensing to noise in different frequency bands.

In an embodiment of the disclosure, the touch driving device is used to drive a touch panel. The touch driving device includes a driving signal generating circuit and a reading circuit. The driving signal generating circuit generates a driving signal for driving the touch panel. The reading circuit reads a sensing result of the touch panel for a touch event. The driving signal includes a first pulse time and a second pulse time for driving a same touch sensor in the touch panel. The driving signal generating circuit uses a first changing strategy to change at least one waveform parameter of the driving signal, so that the at least one waveform parameter of the first pulse time is different from the at least one waveform parameter of the second pulse time.

In an embodiment of the disclosure, the operation method includes: generating a driving signal for driving the touch panel by the driving signal generating circuit of the touch driving device, in which the driving signal includes a first pulse time and a second pulse time for driving the same touch sensor in the touch panel; changing the at least one waveform parameter of the driving signal by the driving signal generating circuit using the first changing strategy, so that the at least one waveform parameter of the first pulse time is different from the at least one waveform parameter of the second pulse time; and reading the sensing result of the touch panel for the touch event by the reading circuit of the touch driving device.

In an embodiment of the disclosure, the touch apparatus includes a touch panel and a touch driving device. The touch driving device is coupled to the touch panel. The touch driving device generates the driving signal for driving the touch panel. The driving signal includes the first pulse time and the second pulse time for driving the same touch sensor in the touch panel. The touch driving device uses the first changing strategy to change the at least one waveform parameter of the driving signal, so that the at least one waveform parameter of the first pulse time is different from the at least one waveform parameter of the second pulse time. The touch driving device reads the sensing result of the touch panel for the touch event.

Based on the above, the touch driving device according to the embodiments of the disclosure changes the waveform parameter of the driving signal for driving the touch panel. Based on the actual design, in different embodiments, the waveform parameter may include one or more of a duty ratio (a duty cycle), a frequency, a stop band, and other waveform parameters. The driving signals of different waveform parameters have different resistance capabilities to different noise frequencies. The touch driving device changes the waveform parameter of different pulse times for driving the same touch sensor to enhance the resistance of the touch sensing to noise in different frequency bands. In some embodiments, since the change of waveform parameter may happen unconditionally, there is no need for additional time to detect noise and decide whether to change to another waveform parameter.

To make the aforementioned more comprehensible, several embodiments accompanied with drawings are described in detail as follows.

DESCRIPTION OF THE EMBODIMENTS

Figure 1:
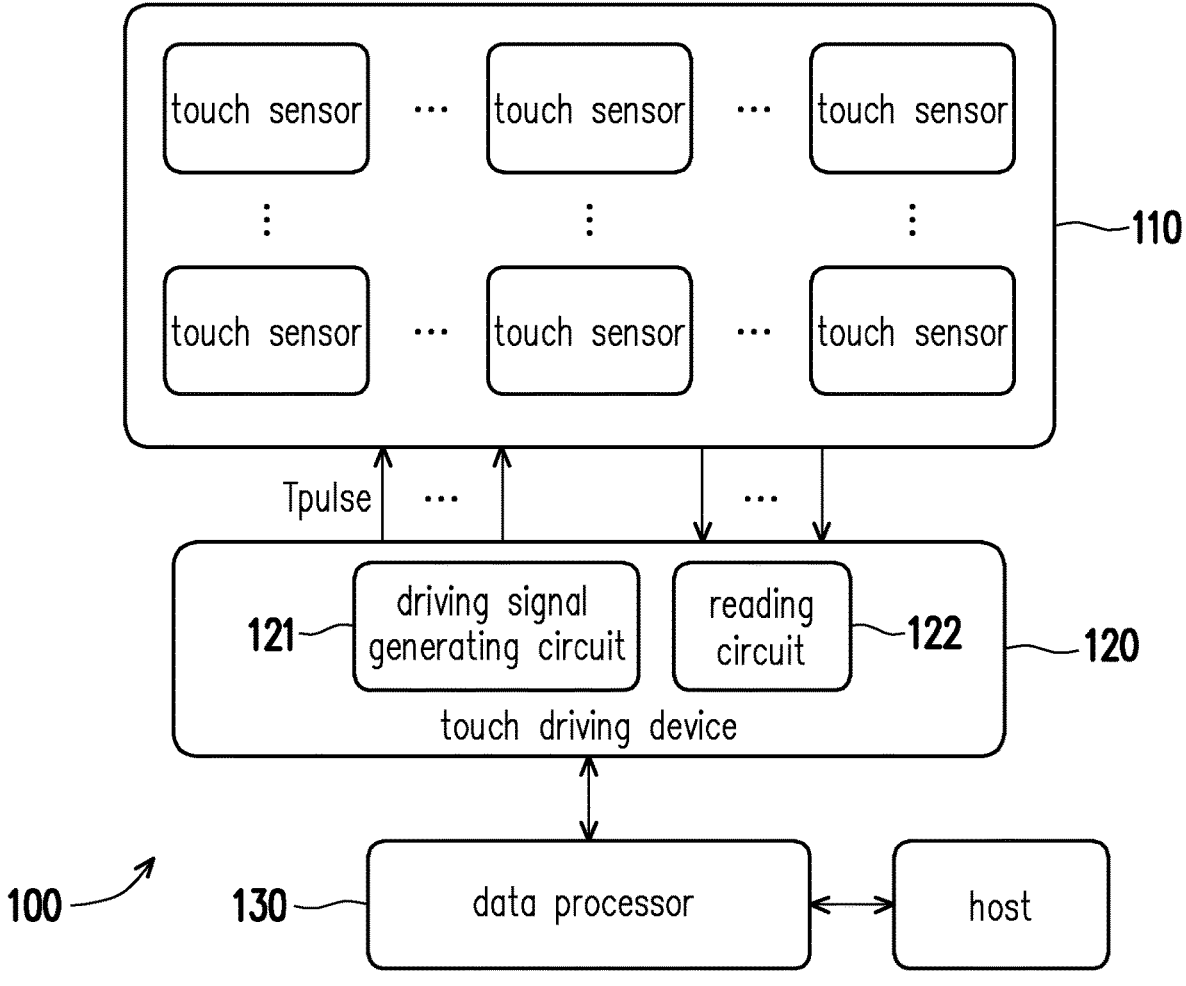
FIG. 1 is a circuit block schematic diagram of a touch apparatus according to an embodiment of the disclosure.

A term "couple (or connected)" used in the full text of the disclosure (including the claims) refers to any direct and indirect connections. For example, if a first device is described to be coupled (or connected) to a second device, it is interpreted as that the first device is directly connected to the second device, or the first device is indirectly connected to the second device through other devices or connection means. The terms "first", "second", and the like as mentioned throughout the full text of the disclosure (including the claims) are used to name the elements or to distinguish between different embodiments or scopes, rather than setting an upper or lower limit on the number of the elements or the order of the elements. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a circuit block schematic diagram of a touch apparatus 100 according to an embodiment of the disclosure. The touch apparatus 100 shown in FIG. 1 includes a touch panel 110 and a touch driving device 120. The touch panel 110 has a touch sensor array. This embodiment does not limit the implementation of the touch panel 110. For example, the touch panel 110 may be a well-known touch panel or other touch panels. According to the actual design, the touch panel 110 may have additional functions (such as a display function and/or other functions), or the touch panel 110 may only have a touch sensing function.

The touch driving device 120 is coupled to the touch panel 110. The touch driving device 120 may drive the touch sensor array of the touch panel 110 through multiple sensing lines (not shown) of the touch panel 110. Therefore, the touch driving device 120 may read a sensing result of the touch panel 110 for a touch event. The touch driving device 120 may report the sensing result to a data processor 130. According to different designs, in some embodiments, the touch driving device 120 may be implemented in form of a hardware circuit. In other embodiments, the touch driving device 120 may be implemented in form of a combination of hardware, firmware, and software (i.e., program).

Regarding the hardware form, the touch driving device 120 may be implemented as a logic circuit on an integrated circuit. For example, the related functions of the touch driving device 120 may be implemented as one or more controllers, microcontrollers, microprocessors, application-specific integrated circuits (ASIC), digital signal processors (DSP), field programmable gate arrays (FPGA), central processing units (CPU), and/or various logic blocks, modules, and circuits in other processing units. The related functions of the touch driving device 120 may be implemented as the hardware circuit, such as the various logic blocks, the modules, and the circuits in the integrated circuit by using hardware description languages (such as Verilog HDL or VHDL) or other proper programming languages.

Regarding the software form and/or the firmware form, the related functions of the touch driving device 120 may be implemented as programming codes. For example, the touch driving device 120 may be implemented by using general programming languages (such as C, C++, or assembly language) or other proper programming languages. The programming code may be recorded/stored in "a non-transitory machine-readable storage medium". In some embodiments, the non-transitory machine-readable storage medium includes, for example, a semiconductor memory and/or a storage device. An electronic device (such as the CPU, the controller, the microcontroller, or the microprocessor) may read and execute the programming codes from the non-transitory machine-readable storage medium, thereby implementing the related functions of the touch driving device 120.

The touch driving device 120 generates a driving signal Tpulse for driving the touch panel 110, and the touch driving device 120 uses a certain changing rule (a first changing strategy) to change at least one waveform parameter of the driving signal Tpulse. Based on the actual design, in different embodiments, the at least one waveform parameter may include one or more of a duty ratio (a duty cycle), a frequency, a stop band, and other waveform parameters. The driving signal Tpulse includes a first pulse time and a second pulse time for driving one same touch sensor in the touch panel 110. In some embodiments, the change of waveform parameter may happen unconditionally. Based on the unconditional change of the waveform parameter, the waveform parameter of the first pulse time is different from the waveform parameter of the second pulse time.

Figure 2:
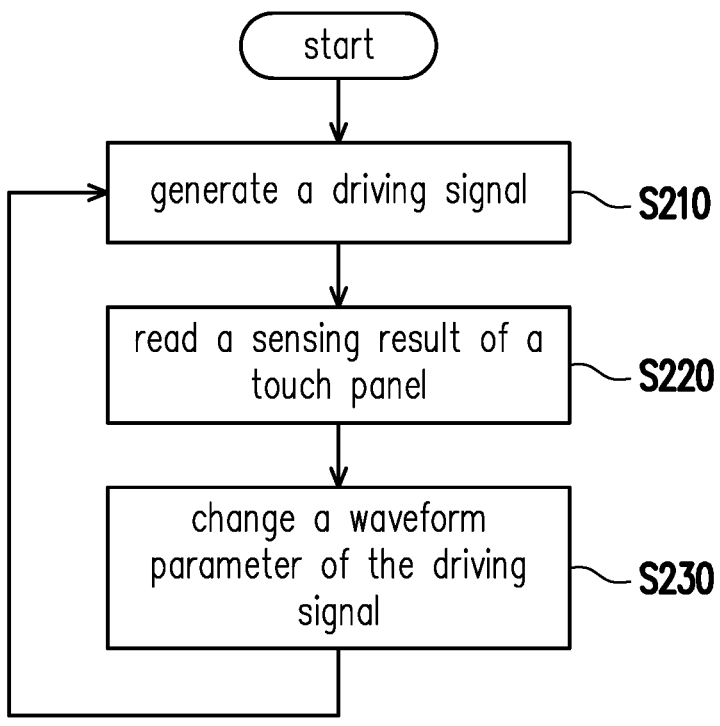
FIG. 2 is a schematic flowchart of an operation method of a touch apparatus according to an embodiment of the disclosure.

FIG. 2 is a schematic flowchart of an operation method of a touch apparatus according to an embodiment of the disclosure. Referring to FIG. 1 and FIG. 2, the touch driving device 120 includes a driving signal generating circuit 121 and a reading circuit 122. In step S210, the driving signal Tpulse for driving the touch panel 110 is generated by the driving signal generating circuit 121. In the embodiment shown in FIG. 1, the driving signal generating circuit 121 applies the driving signal Tpulse to the touch panel 110. In other embodiments, such as the embodiment shown in FIG. 13, the driving signal generating circuit 121 provides the driving signal Tpulse to the reading circuit 122, and the reading circuit 122 reads the sensing result of the touch panel 110 based on the driving signal Tpulse (described later).

Referring to FIG. 1 and FIG. 2, in step S220, the sensing result of the touch panel 110 for the touch event is read by the reading circuit 122. In step S230, at least one waveform parameter of the driving signal Tpulse is changed by the driving signal generating circuit 121 using the first changing strategy. For example, based on the actual design, the at least one waveform parameter may include one or more of the duty ratio, the frequency, the stop band, and other waveform parameters. Based on the change of the waveform parameter of the driving signal Tpulse, the first pulse time and the second pulse time in one same touch sensor in the driving signal for driving the touch panel 110 have different waveform parameters. The change of the waveform parameter in the step S230 is described later with multiple specific examples. After changing the waveform parameter, the step S210 is returned to generate the driving signal Tpulse based on the new waveform parameter.

In summary, the touch driving device 120 may change the waveform parameter of the driving signal for driving the touch panel 110. The driving signals with different waveform parameters have different resistances to different noise frequencies. The touch driving device 120 changes the waveform parameter of different pulse times for driving the same touch sensor to enhance the resistances of the touch sensing to noise in different frequency bands. In some embodiments, the change of waveform parameter may happen unconditionally. Since the change of the waveform parameter is unconditional, the touch driving device 120 does not need extra time to detect noise and decide whether to change to another waveform parameter.

Figure 3:
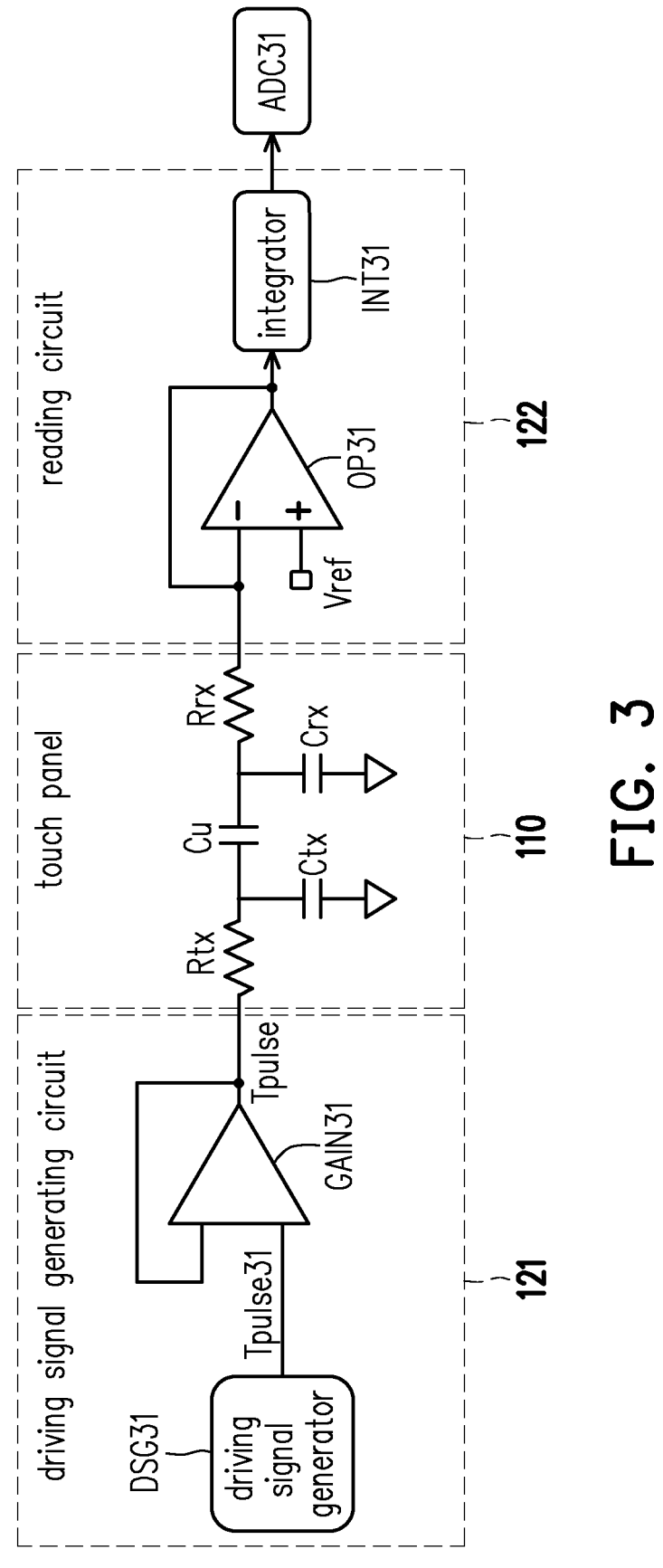
FIG. 3 is a circuit block diagram of the driving signal generating circuit and the reading circuit according to an embodiment of the disclosure.

FIG. 3 is a circuit block diagram of the driving signal generating circuit 121 and the reading circuit 122 according to an embodiment of the disclosure. The touch panel 110, the driving signal generating circuit 121, and the reading circuit 122 shown in FIG. 3 may be used as one of the implementation examples of the touch panel 110, the driving signal generating circuit 121, and the reading circuit 122 shown in FIG. 1. In the touch panel 110 shown in FIG. 3, resistors Rtx and Rrx represent parasitic resistances of different sensing lines of the touch panel 110, capacitances Ctx and Crx represent parasitic capacitances of the sensing lines, and a capacitance Cu represents the parasitic capacitance of the touch sensor of the touch panel 110.

In the embodiment shown in FIG. 3, the driving signal generating circuit 121 includes a driving signal generator DSG31 and a gain circuit GAIN31. The driving signal generator DSG31 generates a driving signal Tpulse31. The driving signal generator DSG31 may change at least one waveform parameter of the driving signal Tpulse31. Based on the actual design, the at least one waveform parameter may include one or more of the duty ratio, the frequency, the stop band, and other waveform parameters. The change to the waveform parameter of the driving signal is described later with multiple specific examples. The gain circuit GAIN31 is coupled to the driving signal generator DSG31 to receive the driving signal Tpulse31. The gain circuit GAIN31 may gain the driving signal Tpulse31 and apply the gained drive signal Tpulse to the touch panel 110.

In the embodiment shown in FIG. 3, the reading circuit 122 includes an operational amplifier OP31 and an integrator INT31. According to the actual design, the operational amplifier OP31 may be a sense amplifier or other amplifier. A first input terminal (for example, a non-inverting input terminal) of the operational amplifier OP31 receives a reference voltage Vref. A level of the reference voltage Vref may be determined according to the actual design. A second input terminal (e.g., an inverting input terminal) of the operational amplifier OP31 is coupled to the touch panel 110. An output terminal of the operational amplifier OP31 is coupled to the second input terminal of the operational amplifier OP31. An input terminal of the integrator INT31 is coupled to the output terminal of the operational amplifier OP31. An output terminal of the integrator INT31 is coupled to the input terminal of an analog-to-digital converter ADC31.

Figure 4:
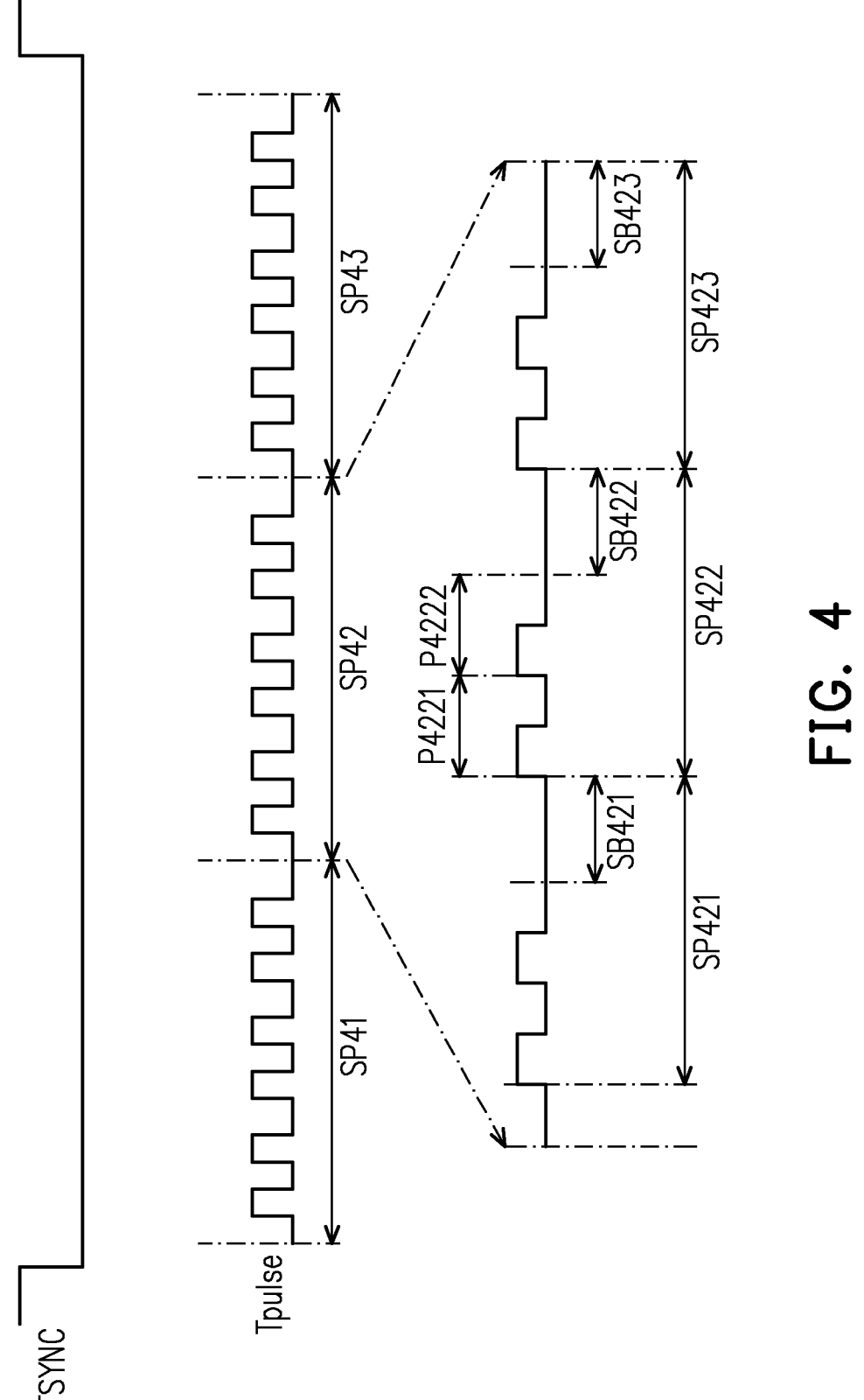
FIG. 4 is a schematic waveform diagram of the driving signal according to an embodiment of the disclosure.

FIG. 4 is a schematic waveform diagram of the driving signal Tpulse according to an embodiment of the disclosure. A horizontal axis of FIG. 4 represents time. Referring to FIG. 1 and FIG. 4, the data processor 130 outputs a touch synchronization signal TSYNC to the touch driving device 120. The touch synchronization signal TSYNC may define a touch sensing period for performing a touch sensing operation on the touch panel 110. For example (but not limited thereto), when the touch synchronization signal TSYNC is at a low logic level, the touch driving device 120 enters the touch sensing period. On the contrary, when the touch synchronization signal TSYNC is at a high logic level, the touch driving device 120 enters a non-touch sensing period (stops the touch sensing operation). Depending on the actual design, the touch panel 110 may perform the additional functions (such as the display function and/or other functions) or not perform the additional functions during the non-touch sensing period.

In the embodiment shown in FIG. 4, the touch sensing period in which the touch sensing operation is performed on the touch panel 110 (the period in which the touch synchronization signal TSYNC is at the low logic level) is divided into multiple scanning periods (three scanning periods SP41, SP42, and SP43 are taken as an example in FIG. 4) corresponding to different sensing areas in the touch panel 110. Each of the scanning periods includes multiple reading periods. For example, the scanning period SP42 includes three reading periods SP421, SP422, and SP423. The touch driving device 120 repeatedly drives and reads one corresponding sensing area corresponding to the reading scanning period SP42 in the reading periods SP421, SP422, and SP423 of the same scanning period SP42. Each of the reading periods includes one stop band. For example, the reading period SP421 includes a stop band SB421. The reading period SP422 includes a stop band SB422. The reading period SP423 includes a stop band SB423. The touch driving device 120 may perform an analog-to-digital conversion on the sensing result of the corresponding sensing area during the stop band.

According to the actual design, in some embodiments, "the first pulse time" and "the second pulse time" mentioned in the related description of FIG. 2 may be different reading periods of one same scanning period. For example (but not limited thereto), "the first pulse time" may be the reading period SP421 of the scanning period SP42, and "the second pulse time" may be the reading period SP422 of the scanning period SP42. In other embodiments, "the first pulse time" and "the second pulse time" mentioned in the related description of FIG. 2 may be different pulse periods in one same reading period. For example (but not limited thereto), "the first pulse time" may be a pulse period P4221 of the reading period SP422, and "the second pulse time" may be a pulse period P4222 of the reading period SP422. The change of the waveform parameter in the step S230 is described below with multiple specific examples.

Figures 5, 6:
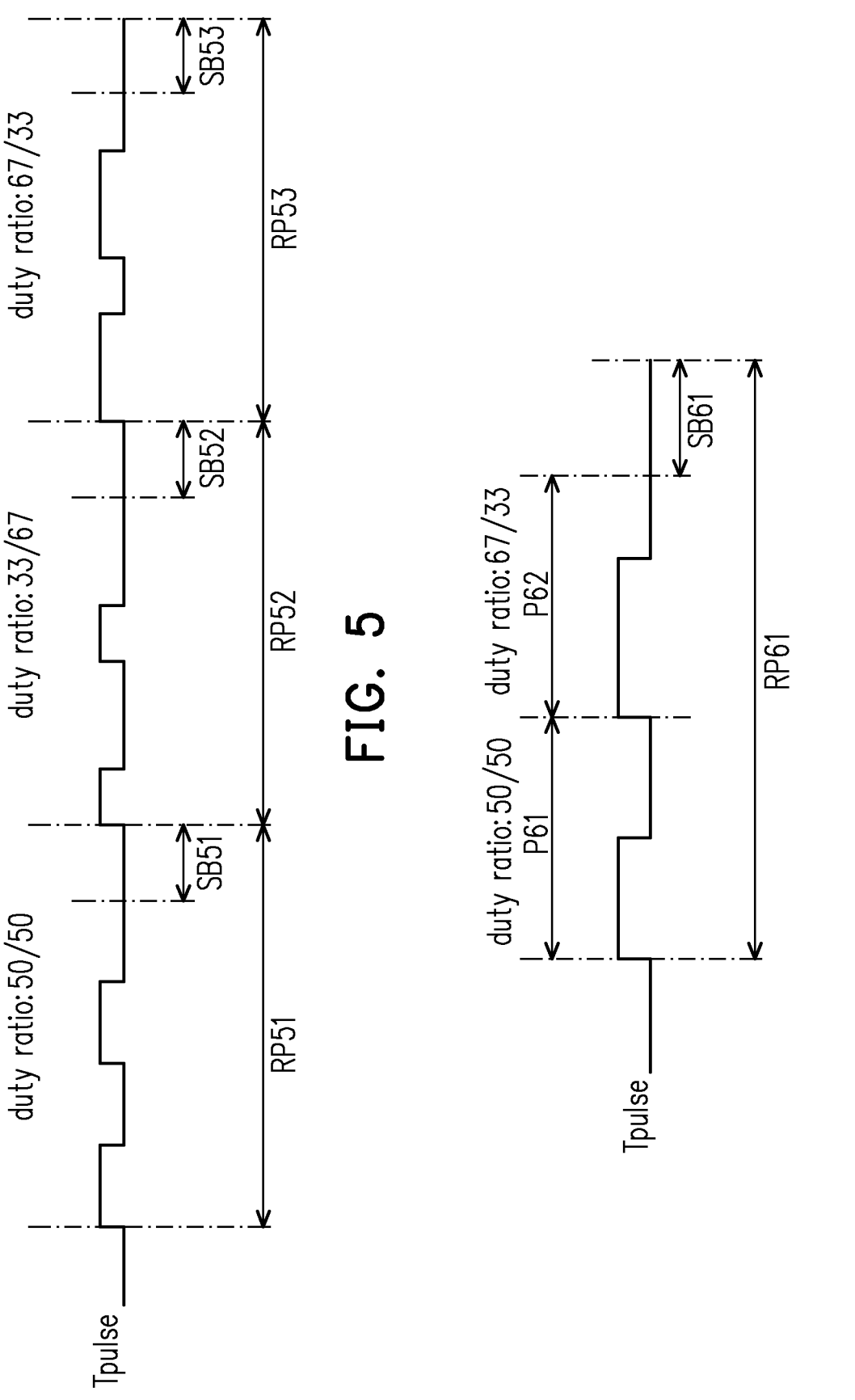
FIG. 5 is a schematic waveform diagram of the driving signal according to another embodiment of the disclosure.
FIG. 6 is a schematic waveform diagram of the driving signal according to another embodiment of the disclosure.

FIG. 5 is a schematic waveform diagram of the driving signal Tpulse according to another embodiment of the disclosure. The horizontal axis of FIG. 5 represents time. FIG. 5 shows three reading periods RP51, RP52, and RP53. Each of the reading periods includes one stop band (e.g. SB51, SB52, and SB53). Referring to FIG. 1 and FIG. 5, the touch driving device 120 repeatedly drives and reads one same sensing area of the touch panel 110 during the reading periods RP51, RP52, and RP53. The reading periods RP51, RP52, and RP53 and the stop bands SB51, SB52, and SB53 shown in FIG. 5 may be deduced with reference to the related descriptions of the reading periods SP421, SP422, and SP423 and the stop bands SB421, SB422, and SB423 shown in FIG. 4, therefore is not repeated herein.

In the embodiment shown in FIG. 5, "the first pulse time" may be the reading period RP51. "The second pulse time" may be the reading period RP52. "The third pulse time" may be the reading period RP53. In addition, the embodiment shown in FIG. 5 takes the duty ratio as an example of "the waveform parameter being changed". In the embodiment shown in FIG. 5, "the changing strategy" includes as follows. The duty ratio of the reading period RP51 is set to a first ratio (such as 50/50 or other ratios). The duty ratio of the reading period RP52 is set to a second ratio different from the first ratio (such as 33/67 or other ratios). The duty ratio of the reading period RP53 is set to a third ratio different from the first ratio and the second ratio (such as 67/33 or other ratios).

FIG. 6 is a schematic waveform diagram of the driving signal Tpulse according to another embodiment of the disclosure. The horizontal axis of FIG. 6 represents time. FIG. 6 shows a reading period RP61. The reading period RP61 includes a pulse period P61, a pulse period P62, and a stop band SB61. The reading period RP61, the pulse period P61, the pulse period P62, and the stop band SB61 shown in FIG. 6 may be deduced with reference to the related descriptions of the reading period SP422, the pulse period P4221, the pulse period P4222, and the stop band SB422 shown in FIG. 4, therefore is not repeated herein. In the embodiment shown in FIG. 6, "the first pulse time" may be the pulse period P61, and "the second pulse time" may be the pulse period P62. In addition, the embodiment shown in FIG. 6 takes the duty ratio as an example of "the waveform parameter being changed". In the embodiment shown in FIG. 6, the "changing strategy" includes as follows. The duty ratio of the pulse period P61 is set to the first ratio (such as 50/50 or other ratios). The duty ratio of the pulse period P62 is set to the second ratio different from the first ratio (such as 67/33 or other ratios).

Figures 7, 8:
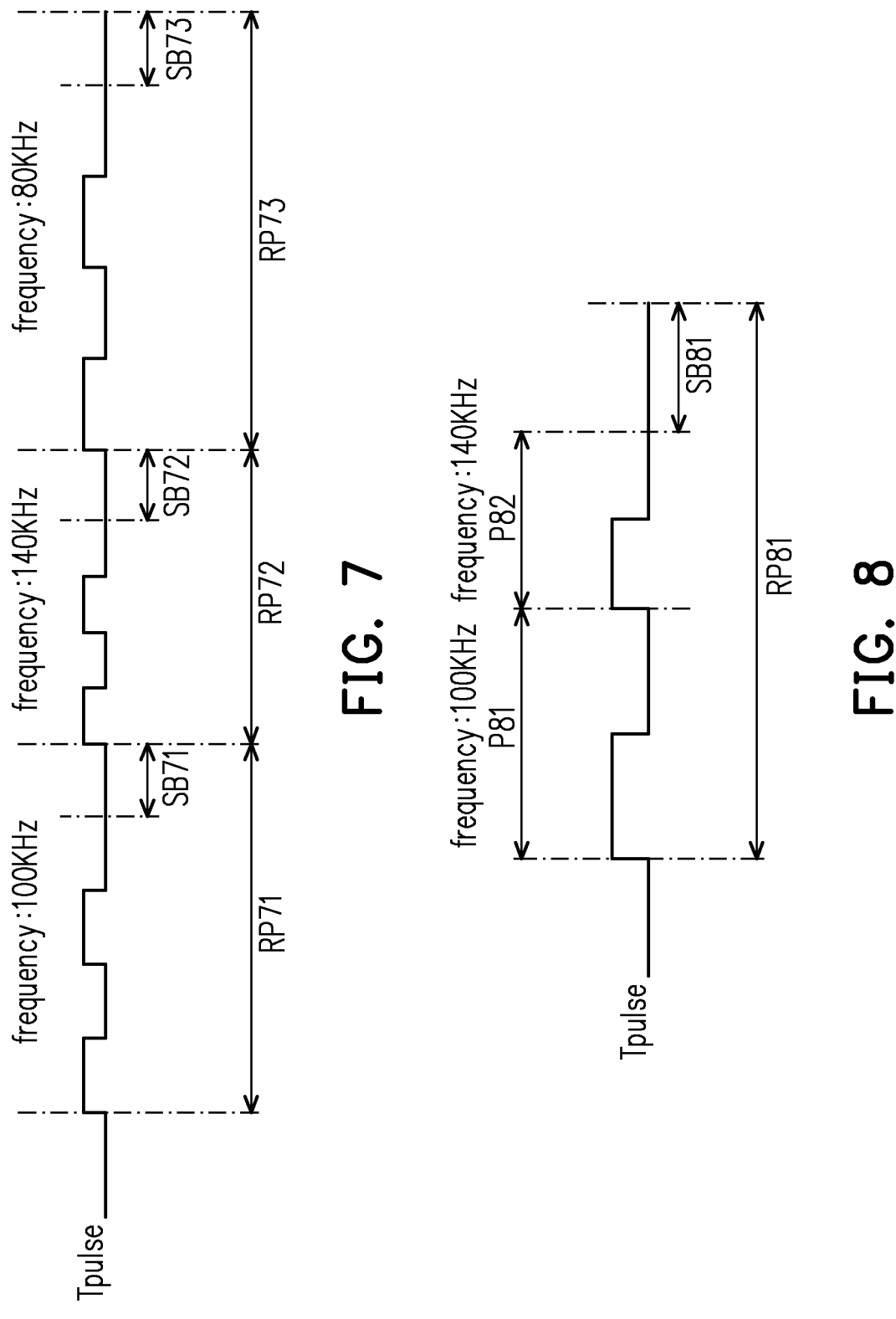
FIG. 7 is a schematic waveform diagram of the driving signal according to another embodiment of the disclosure.
FIG. 8 is a schematic waveform diagram of the driving signal according to another embodiment of the disclosure.

FIG. 7 is a schematic waveform diagram of the driving signal Tpulse according to another embodiment of the disclosure. The horizontal axis of FIG. 7 represents time. FIG. 7 shows three reading periods RP71, RP72, and RP73. Each of the reading period includes one stop band (e.g. SB71, SB72, and SB73). Referring to FIG. 1 and FIG. 7, the touch driving device 120 repeatedly drives and reads one same sensing area of the touch panel 110 during the reading periods RP71, RP72, and RP73. The reading periods RP71, RP72, and RP73 and the stop bands SB71, SB72, and SB73 shown in FIG. 7 may be deduced with reference to the related descriptions of the reading periods SP421, SP422, and SP423 and the stop bands SB421, SB422, and SB423 shown in FIG. 4, therefore is not repeated herein.

In the embodiment shown in FIG. 7, "the first pulse time" may be the reading period RP71. "The second pulse time" may be the reading period RP72. "The third pulse time" may be the reading period RP73. In addition, the embodiment shown in FIG. 7 takes the frequency as an example of "the waveform parameter being changed". In the embodiment shown in FIG. 7, "the changing strategy" includes as follows. The frequency of the reading period RP71 is set to a first frequency value (such as 100 KHz or other frequency values). The frequency of the reading period RP72 is set to a second frequency value (such as 140 KHz or other frequency values) different from the first frequency value. The frequency of the reading period RP73 is set to a third frequency value (such as 80 KHz or other values) different from the first frequency value and the second frequency value.

FIG. 8 is a schematic waveform diagram of the driving signal Tpulse according to another embodiment of the disclosure. The horizontal axis of FIG. 8 represents time. FIG. 8 shows a reading period RP81. The reading period RP81 includes a pulse period P81, a pulse period P82, and a stop band SB81. The reading period RP81, the pulse period P81, the pulse period P82, and the stop time SB81 shown in FIG. 8 may be deduced with reference to the related descriptions of the reading period SP422, the pulse period P4221, the pulse period P4222, and the stop band SB422 shown in FIG. 4, therefore is not repeated herein. In the embodiment shown in FIG. 8, "the first pulse time" may be the pulse period P81, and "the second pulse time" may be the pulse period P82. In addition, the embodiment shown in FIG. 8 takes the frequency as an example of "the waveform parameter being changed". In the embodiment shown in FIG. 8, "the changing strategy" includes as follows. The frequency of the pulse period P81 is to the first frequency value (such as 100 KHz or other frequency values). The frequency of the pulse period P82 is set to the second frequency value (such as 140 KHz or other frequency values) different from the first frequency value.

Figures 9, 10:
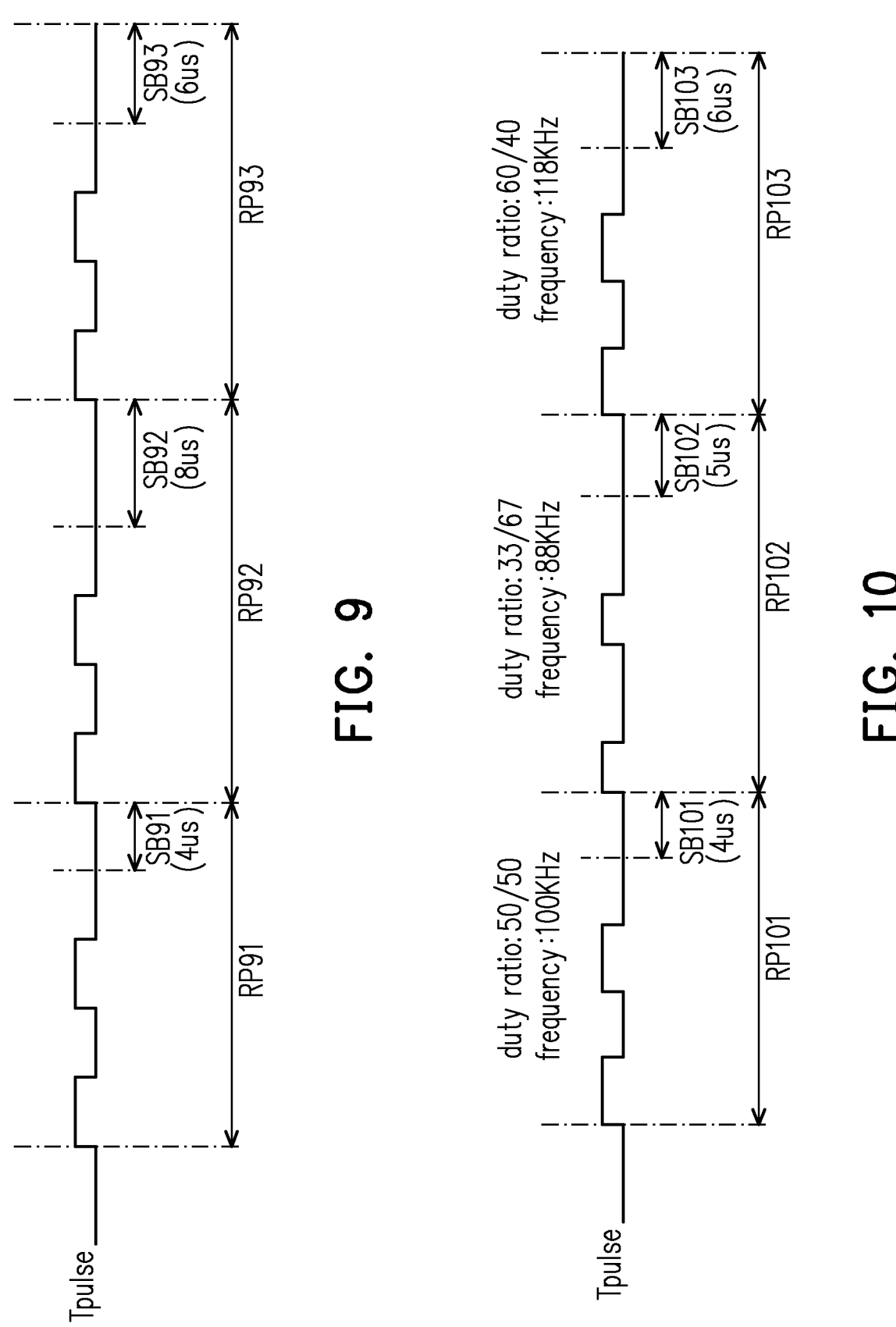
FIG. 9 is a schematic waveform diagram of the driving signal according to another embodiment of the disclosure.
FIG. 10 is a schematic waveform diagram of the driving signal according to another embodiment of the disclosure.

FIG. 9 is a schematic waveform diagram of the driving signal Tpulse according to another embodiment of the disclosure. The horizontal axis of FIG. 9 represents time. FIG. 9 shows three reading periods RP91, RP92, and RP93.

Each of the reading periods includes one stop band (e.g., SB91, SB92, and SB93). Referring to FIG. 1 and FIG. 9, the touch driving device 120 repeatedly drives and reads one same sensing area of the touch panel 110 during the reading periods RP91, RP92, and RP93. The reading periods RP91, RP92, and RP93 and the stop bands SB91, SB92, and SB93 shown in FIG. 9 may be deduced with reference to the related descriptions of the reading periods SP421, SP422, and SP423 and the stop bands SB421, SB422, and SB423 shown in FIG. 4, therefore is not repeated herein.

In the embodiment shown in FIG. 9, "the first pulse time" may be the reading period RP91. "The second pulse time" may be the reading period RP92. "The third pulse time" may be the reading period RP93. In addition, the embodiment shown in FIG. 9 takes the stop band as an example of "the waveform parameter being changed". In the embodiment shown in FIG. 9, "the changing strategy" includes as follows. The stop band of the reading period RP71 is set to a first duration (such as 4 us or other durations). The stop band of the reading period RP72 is set to a second duration (such as 8 us or other durations) different from the first duration. The stop band of the reading period RP73 is set to a third duration (such as 6 us or other durations) different from the first duration and the second duration.

FIG. 10 is a schematic waveform diagram of the driving signal Tpulse according to another embodiment of the disclosure. The horizontal axis of FIG. 10 represents time. FIG. 10 shows three reading periods RP101, RP102, and RP103. Each of the reading periods includes one stop band (e.g., SB101, SB102, and SB103). Referring to FIG. 1 and FIG. 10, the touch driving device 120 repeatedly drives and reads one same sensing area of the touch panel 110 during the reading periods RP101, RP102, and RP103. The reading periods RP101, RP102, and RP103 and the stop bands SB101, SB102, and SB103 shown in FIG. 10 may be deduced with reference to the related descriptions of the reading periods SP421, SP422, and SP423 and the stop bands SB421, SB422, and SB423 shown in FIG. 4, therefore is not repeated herein.

In the embodiment shown in FIG. 10, "the first pulse time" may be the reading period RP101. "The second pulse time" may be the reading period RP102. "The third pulse time" may be the reading period RP103. In addition, the embodiment shown in FIG. 10 takes the duty ratio, the frequency, and the stop band as the examples of "the waveform parameter being changed". In the embodiment shown in FIG. 10, "the change strategy" includes as follows. The duty ratio, the frequency, and the stop band of the reading period RP101 are respectively set to the first ratio (such as 50/50 or other ratios), the first frequency value (such as 100 KHz or other frequency values), and the first duration (such as 4 us or other durations). The duty ratio, the frequency, and the stop band of the reading period RP102 are respectively set to the second ratio (such as 33/67 or other ratios), the second frequency value (such as 88 KHz or other frequency values), and the second duration (such as 5 us or other durations). The duty ratio, the frequency, and stop band of the reading period RP103 are respectively set to the third ratio value (such as 60/40 or other ratios), the third frequency value (such as 118 KHz or other frequency values), and the third duration (such as 6 us or other durations).

Based on the actual design, in some embodiments, "the changing strategy" for changing the waveform parameter may be a single strategy (for example, the changing strategy shown in one of FIGS. 5 to 10). In other embodiments, "the changing strategy" for changing the waveform parameter may be multiple strategies that are applied in turn. For example, in response to the sensing result read by the reading circuit 122 being poor quality of signals when the driving signal generating circuit 121 uses the first changing strategy, the driving signal generating circuit 121 uses a second changing strategy from the first changing strategy to change at least one waveform parameter of the driving signal Tpulse.

Figures 11, 12:
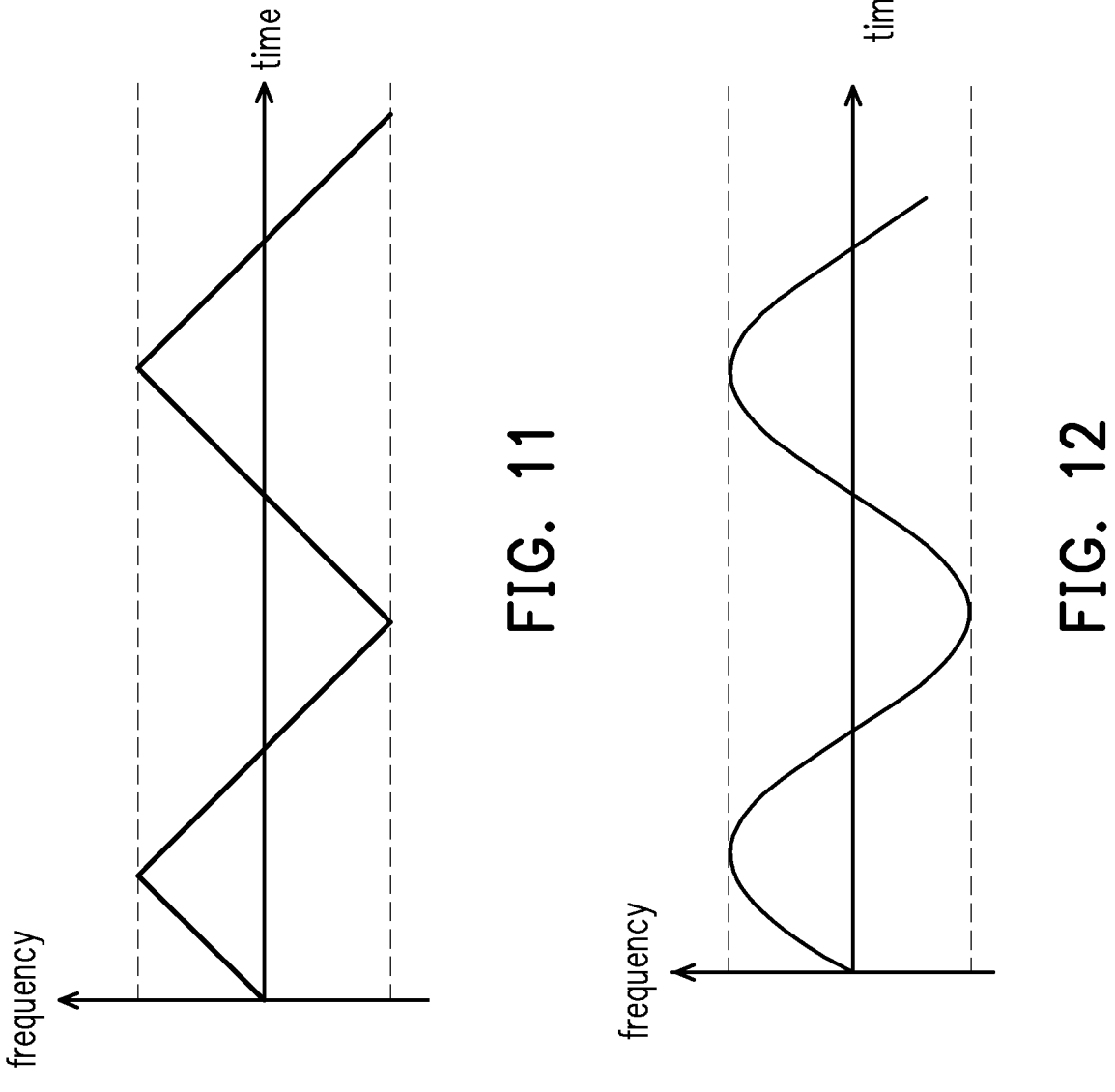
FIG. 11 is a schematic waveform diagram of a basic clock according to an embodiment of the disclosure.
FIG. 12 is a schematic waveform diagram of a basic clock according to another embodiment of the disclosure.

FIG. 11 is a schematic waveform diagram of a basic clock according to an embodiment of the disclosure. The horizontal axis of FIG. 11 represents time, and the vertical axis of FIG. 11 represents the frequency of the basic clock. FIG. 12 is a schematic waveform diagram of a basic clock according to another embodiment of the disclosure. The horizontal axis of FIG. 12 represents time, and the vertical axis of FIG. 12 represents the frequency of the basic clock. Referring to FIG. 1, FIG. 11, and FIG. 12, the driving signal generating circuit 121 may use the frequency of the basic clock shown in FIG. 11 or FIG. 12 to generate the driving signal Tpulse for driving the touch panel 110. Therefore, different pulse times in the driving signal Tpulse may have different frequencies, thereby achieving "the frequency (the waveform parameter) being changed".

Figure 13:
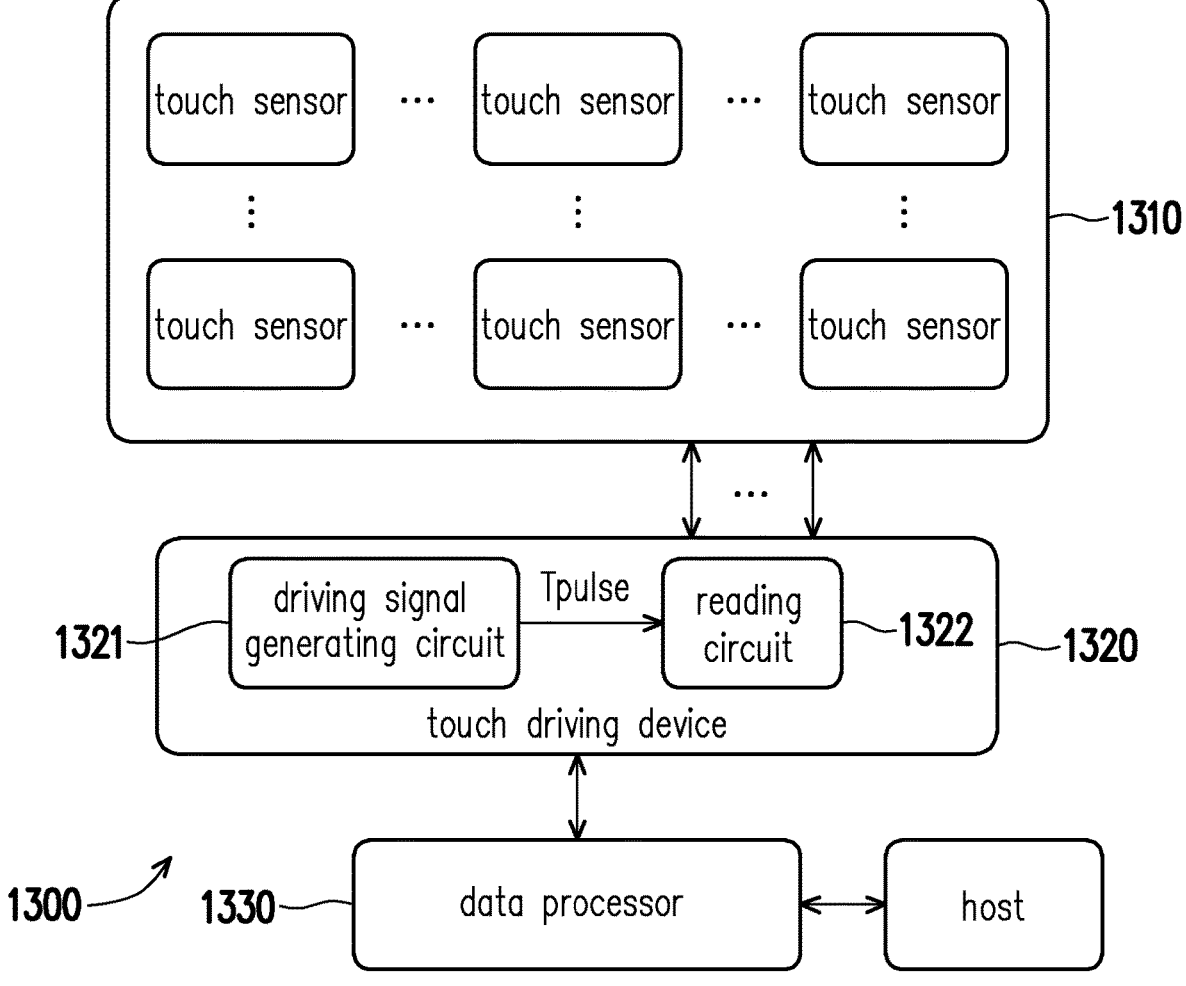
FIG. 13 is a circuit block diagram of a touch apparatus according to another embodiment of the disclosure.

FIG. 13 is a circuit block diagram of a touch apparatus 1300 according to another embodiment of the disclosure. The touch apparatus 1300 shown in FIG. 13 includes a touch panel 1310 and a touch driving device 1320. The touch driving device 1320 is coupled to the sensing lines (not shown) of the touch panel 1310 to drive the touch sensor array of the touch panel 1310 and read the sensing result of the touch panel 1310 for the touch event. The touch driving device 1320 may report the sensing result to the data processor 1330. The touch apparatus 1300, touch panel 1310, the touch driving device 1320, and the data processor 1330 shown in FIG. 13 may be deduced with reference to the related descriptions of the touch apparatus 100, the touch panel 110, the touch driving device 120, and the data processor 130 shown in FIG. 1, therefore is not repeated herein.

In the embodiment shown in FIG. 13, the touch driving device 1320 includes a driving signal generating circuit 1321 and a reading circuit 1322. The driving signal generating circuit 1321 provides the driving signal Tpulse to the reading circuit 1322. The driving signal generation circuit 1321 shown in FIG. 13 may be deduced with reference to the related descriptions of the driving signal generation circuit 121 shown in FIG. 1, and the driving signal Tpulse shown in FIG. 13 may be deduced with reference to the related descriptions of the driving signal Tpulse shown in FIGS. 1 to 10, therefore is not repeated herein. Based on the driving signal Tpulse, the reading circuit 1322 may read the sensing result of the touch panel 1310.

Figure 14:
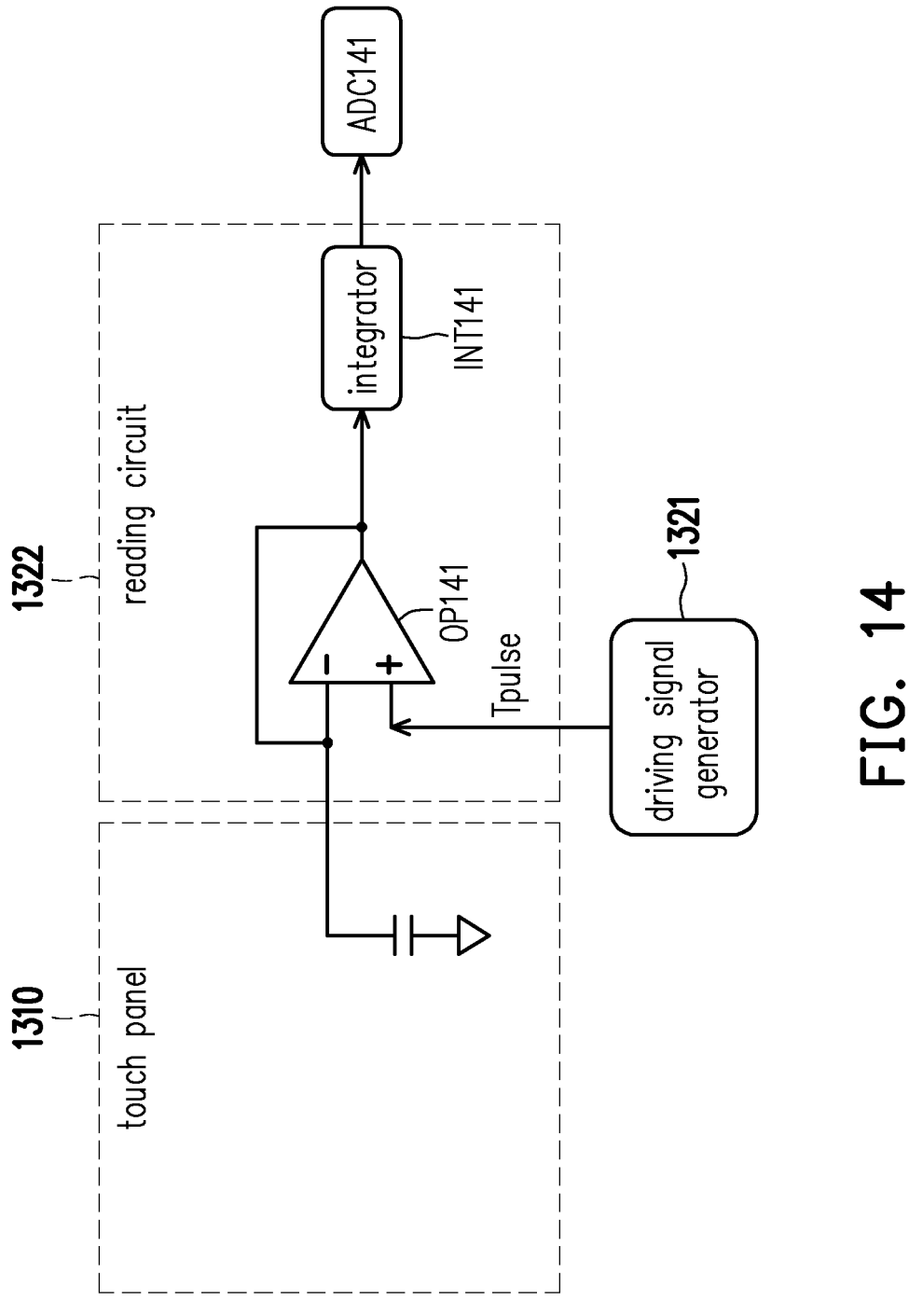
FIG. 14 is a circuit block diagram of the driving signal generating circuit, and the reading circuit according to an embodiment of the disclosure.

FIG. 14 is a circuit block diagram of the driving signal generating circuit 1321, and the reading circuit 1322 according to an embodiment of the disclosure. The touch panel 1310, the driving signal generating circuit 1321, and the reading circuit 1322 shown in FIG. 14 may be used as one of the implementation examples of the touch panel 1310, the driving signal generating circuit 1321, and the reading circuit 1322 shown in FIG. 13. A capacitance symbol in the touch panel 1310 shown in FIG. 14 represents the parasitic capacitance of the touch sensor of the touch panel 110.

In the embodiment shown in FIG. 14, the reading circuit 1322 includes an operational amplifier OP141 and an integrator INT141. The first input terminal (e.g., the non-inverting input terminal) of the operational amplifier OP141 is coupled to the driving signal generating circuit 1321 to receive the driving signal Tpulse. The second input terminal (e.g., the inverting input terminal) of the operational amplifier OP141 is coupled to the touch panel 110. The output terminal of the operational amplifier OP141 is coupled to the second input terminal of the operational amplifier OP141. The input terminal of the integrator INT141 is coupled to the output terminal of the operational amplifier OP141. The output terminal of the integrator INT141 is coupled to the input terminal of the analog-to-digital converter ADC141.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A touch driving device configured to drive a touch panel, wherein the touch driving device comprises:
   a driving signal generating circuit generating a driving signal for driving the touch panel; and
   a reading circuit reading a sensing result of the touch panel for a touch event, wherein
   the driving signal comprises a first pulse time and a second pulse time for driving a same touch sensor in the touch panel, and the driving signal generating circuit changes at least one wave parameter of the driving signal by a first changing strategy, so that the at least one waveform parameter of the first pulse time is different from the at least one waveform parameter of the second pulse time,
   wherein in response to the situation where the driving signal generating circuit uses the first changing strategy and the sensing result read by the reading circuit is poor quality of signals, the driving signal generating circuit changes the at least one waveform parameter of the driving signal by a second changing strategy different from the first changing strategy.

2. The touch driving device according to claim 1, wherein the driving signal generating circuit applies the driving signal to the touch panel.

3. The touch driving device according to claim 2, wherein the driving signal generating circuit comprises:
   a driving signal generator generating the driving signal; and
   a gain circuit coupled to the driving signal generator to receive the driving signal, wherein the gain circuit applies the gained driving signal to the touch panel.

4. The touch driving device according to claim 2, wherein the reading circuit comprises:
   an operational amplifier, wherein a first input terminal of the operational amplifier receives a reference voltage, a second input terminal of the operational amplifier is coupled to the touch panel, and an output terminal of the operational amplifier is coupled to the second input terminal of the operational amplifier; and
   an integrator, wherein an input terminal of the integrator is coupled to the output terminal of the operational amplifier, and an output terminal of the integrator is coupled to an analog-to-digital converter.

5. The touch driving device according to claim 1, wherein the driving signal generating circuit provides the driving signal to the reading circuit, and the reading circuit reads the sensing result of the touch panel based on the driving signal.

6. The touch driving device according to claim 5, wherein the reading circuit comprises:

an operational amplifier, wherein a first input terminal of the operational amplifier is coupled to the driving signal generating circuit to receive the driving signal, a second input terminal of the operational amplifier is coupled to the touch panel, and an output terminal of the operational amplifier is coupled to the second input terminal of the operational amplifier; and an integrator, wherein an input terminal of the integrator is coupled to the output terminal of the operational amplifier, and an output terminal of the integrator is coupled to an analog-to-digital converter.

7. The touch driving device according to claim 1, wherein a touch sensing period in which a touch sensing operation is performed on the touch panel is divided into a plurality of scanning periods corresponding to different sensing areas in the touch panel, each of the plurality of scanning periods comprises a plurality of reading periods, the touch driving device repeatedly drives and reads one corresponding sensing area among the different sensing areas corresponding to one same scanning period among the plurality of scanning periods during the plurality of reading periods of the one same scanning period.

8. The touch driving device according to claim 7, wherein the first pulse time is one of the plurality of reading periods of the one same scanning period, and the second pulse time is another one of the plurality of reading periods of the one same scanning period.

9. The touch driving device according to claim 8, wherein the at least one waveform parameter comprises a stop band in each of the plurality of reading periods, and the first changing strategy comprises:

setting the stop band of the first pulse time to a first duration; and setting the stop band of the second pulse time to a second duration different from the first duration.

10. The touch driving device according to claim 9, wherein the touch driving device performs an analog-to-digital conversion on the sensing result of the corresponding sensing area during the stop band.

11. The touch driving device according to claim 9, wherein the driving signal further comprises a third pulse time for driving the same touch sensor, the first pulse time, the second pulse time, and the third pulse time are different reading periods among the plurality of the reading periods of the one same scanning period, and the first changing strategy further comprises:

setting the stop band of the third pulse time to a third duration different from the first duration and the second duration.

12. The touch driving device according to claim 7, wherein the first pulse time and the second pulse time are different pulse periods in a same reading period among the plurality of reading periods of the one same scanning period.

13. The touch driving device according to claim 1, wherein the at least one waveform parameter comprises a duty ratio, and the first changing strategy comprises:

setting the duty ratio of the first pulse time to a first ratio; and setting the duty ratio of the second pulse time to a second ratio different from the first ratio.

14. The touch driving device according to claim 13, wherein the driving signal further comprises a third pulse time for driving the same touch sensor, and the first changing strategy further comprises:

setting the duty ratio of the third pulse time to a third ratio different from the first ratio and the second ratio.

15. The touch driving device according to claim 1, wherein the at least one waveform parameter comprises a frequency, and the first changing strategy comprises:

setting the frequency of the first pulse time to a first frequency value; and setting the frequency of the second pulse time to a second frequency value different from the first frequency value.

16. The touch driving device according to claim 15, wherein the driving signal further comprises a third pulse time for driving the same touch sensor, and the first changing strategy further comprises:

setting the frequency of the third pulse time to a third frequency value different from the first frequency value and the second frequency value.

17. An operation method of a touch driving device, wherein the touch driving device is configured to drive a touch panel, and the operation method comprises:

generating a driving signal for driving the touch panel by a driving signal generating circuit of the touch driving device, wherein the driving signal comprises a first pulse time and a second pulse time for driving a same touch sensor in the touch panel;

changing at least one waveform parameter of the driving signal by the driving signal generating circuit using a first changing strategy, so that the at least one waveform parameter of the first pulse time is different from the at least one waveform parameter of the second pulse time;

reading a sensing result of the touch panel for a touch event by a reading circuit of the touch driving device; and in response to the situation where the driving signal generating circuit uses the first changing strategy and the sensing result read by the reading circuit is poor quality of signals, changing the at least one waveform parameter of the driving signal by using a second changing strategy different from the first changing strategy.

18. The operation method according to claim 17, further comprising:

applying the driving signal to the touch panel by the driving signal generating circuit.

19. The operation method according to claim 17, further comprising:

providing the driving signal to the reading circuit by the driving signal generating circuit; and reading the sensing result of the touch panel by the reading circuit based on the driving signal.

20. The operation method according to claim 17, wherein a touch sensing period in which a touch sensing operation is performed on the touch panel is divided into a plurality of scanning periods corresponding to different sensing areas in the touch panel, and each of the plurality of scanning periods comprises a plurality of reading periods, and the operation method further comprises:

repeatedly driving and reading one corresponding sensing area among the different sensing areas corresponding to one same scanning period among the plurality of scanning periods during the plurality of reading periods of the one same scanning period.

21. The operation method according to claim 20, wherein the first pulse time is one of the plurality of reading periods of the one same scanning period, and the second pulse time is another one of the plurality of reading periods of the one same scanning period.

22. The operation method according to claim 21, wherein the at least one waveform parameter comprises a stop band in each of the plurality of reading periods, and the first changing strategy comprises:

setting the stop band of the first pulse time to a first duration; and setting the stop band of the second pulse time to a second duration different from the first duration.

23. The operation method according to claim 22, further comprising:

performing an analog-to-digital conversion on the sensing result of the corresponding sensing area during the stop band.

24. The operation method according to claim 22, wherein the driving signal further comprises a third pulse time for driving the same touch sensor, the first pulse time, the second pulse time, and the third pulse time are different reading periods among the plurality of reading periods of the one same scanning period, and the first changing strategy further comprises:

setting the stop band of the third pulse time to a third duration different from the first duration and the second duration.

25. The operation method according to claim 20, wherein the first pulse time and the second pulse time are different pulse periods in a same read period among the plurality of reading periods of the one same scanning period.

26. The operation method according to claim 17, wherein the at least one waveform parameter comprises a duty ratio, and the first changing strategy comprises:

setting the duty ratio of the first pulse time to a first ratio; and setting the duty ratio of the second pulse time to a second ratio different from the first ratio.

27. The operation method according to claim 26, wherein the driving signal further comprises a third pulse time for driving the same touch sensor, and the first changing strategy further comprises:

setting the duty ratio of the third pulse time to a third ratio different from the first ratio and the second ratio.

28. The operation method according to claim 17, wherein the at least one waveform parameter comprises a frequency, and the first changing strategy comprises:

setting the frequency of the first pulse time to a first frequency value; and setting the frequency of the second pulse time to a second frequency value different from the first frequency value.

29. The operation method according to claim 28, wherein the driving signal further comprises a third pulse time for driving the same touch sensor, and the first changing strategy further comprises:

setting the frequency of the third pulse time to a third frequency value different from the first frequency value and the second frequency value.

30. A touch apparatus comprising:

a touch panel; and a touch driving device coupled to the touch panel, wherein the touch driving device generates a driving signal for driving the touch panel, the driving signal comprises a first pulse time and a second pulse time for driving a same touch sensor in the touch panel, the touch driving device changes at least one waveform parameter of the driving signal by a first changing strategy, so that the at least one waveform parameter of the first pulse time is different from the at least one waveform parameter of the second pulse time, and the touch driving device reads a sensing result of the touch panel for a touch event, wherein the touch driving device comprises:

a driving signal generating circuit generating the driving signal for driving the touch panel, wherein the driving signal generating circuit changes the at least one waveform parameter of the driving signal by the first changing strategy, so that the at least one waveform parameter of the first pulse time is different from the at least one waveform parameter of the second pulse time; and a reading circuit reading the sensing result of the touch panel for the touch event, wherein in response to the situation where the driving signal generating circuit uses the first changing strategy and the sensing result read by the reading circuit is poor quality of signals, the driving signal generating circuit changes the at least one waveform parameter of the driving signal by a second changing strategy different from the first changing strategy.

31. The touch apparatus according to claim 30, wherein the driving signal generating circuit applies the driving signal to the touch panel.

32. The touch apparatus according to claim 31, wherein the driving signal generating circuit comprises:

a driving signal generator generating the driving signal; and a gain circuit coupled to the driving signal generator to receive the driving signal, wherein the gain circuit applies the gained driving signal to the touch panel.

33. The touch apparatus according to claim 31, wherein the reading circuit comprises:

an operational amplifier, wherein a first input terminal of the operational amplifier receives a reference voltage, a second input terminal of the operational amplifier is coupled to the touch panel, and an output terminal of the operational amplifier is coupled to the second input terminal of the operational amplifier; and an integrator, wherein an input terminal of the integrator is coupled to the output terminal of the operational amplifier, and an output terminal of the integrator is coupled to an analog-to-digital converter.

34. The touch apparatus according to claim 30, wherein the driving signal generating circuit provides the driving signal to the reading circuit, and the reading circuit reads the sensing result of the touch panel based on the driving signal.

35. The touch apparatus according to claim 34, wherein the reading circuit comprises:

an operational amplifier, wherein a first input terminal of the operational amplifier is coupled to the driving signal generating circuit to receive the driving signal, a second input terminal of the operational amplifier is coupled to the touch panel, and an output terminal of the operational amplifier is coupled to the second input terminal of the operational amplifier; and an integrator, wherein an input terminal of the integrator is coupled to the output terminal of the operational amplifier, and an output terminal of the integrator is coupled to an analog-to-digital converter.

36. The touch apparatus according to claim 30, wherein a touch sensing period in which a touch sensing operation is performed on the touch panel is divided into a plurality of scanning periods corresponding to different sensing areas in the touch panel, each of the plurality of scanning periods comprises a plurality of reading periods, the touch driving device repeatedly drives and reads one corresponding sensing area among the different sensing areas corresponding to one same scanning period among the plurality of scanning periods during the plurality of reading periods of the one same scanning period.

37. The touch apparatus according to claim 36, wherein the first pulse time is one of the plurality of reading periods of the one same scanning period, and the second pulse time is another one of the plurality of reading periods of the one same scanning period.

38. The touch apparatus according to claim 37, wherein the at least one waveform parameter comprises a stop band in each of the plurality of reading periods, and the first changing strategy comprises:

setting the stop band of the first pulse time to a first duration; and setting the stop band of the second pulse time to a second duration different from the first duration.

39. The touch apparatus according to claim 38, wherein the touch driving device performs an analog-to-digital conversion on the sensing result of the corresponding sensing area during the stop band.

40. The touch apparatus according to claim 38, wherein the driving signal further comprises a third pulse time for driving the same touch sensor, the first pulse time, the second pulse time, and the third pulse time are different reading periods among the plurality of reading periods of the one same scanning period, and the first changing strategy further comprises:

setting the stop band of the third pulse time to a third duration different from the first duration and the second duration.

41. The touch apparatus according to claim 36, wherein the first pulse time and the second pulse time are different pulse periods in a same reading period among the plurality of reading periods of the one same scanning period.

42. The touch apparatus according to claim 30, wherein the at least one waveform parameter comprises a duty ratio, and the first changing strategy comprises:

setting the duty ratio of the first pulse time to a first ratio; and setting the duty ratio of the second pulse time to a second ratio different from the first ratio.

43. The touch apparatus according to claim 42, wherein the driving signal further comprises a third pulse time for driving the same touch sensor, and the first changing strategy further comprises:

setting the duty ratio of the third pulse time to a third ratio different from the first ratio and the second ratio.

44. The touch apparatus according to claim 30, wherein the at least one waveform parameter comprises a frequency, and the first changing strategy comprises:

setting the frequency of the first pulse time to a first frequency value; and setting the frequency of the second pulse time to a second frequency value different from the first frequency value.

45. The touch apparatus according to claim 44, wherein the driving signal further comprises a third pulse time for driving the same touch sensor, and the first changing strategy further comprises:

setting the frequency of the third pulse time to a third frequency value different from the first frequency value and the second frequency value.

\* \* \* \* \*